March 19, 1957 C. B. CARLSON 2,785,650
CONFECTIONARY COATING APPARATUS
Filed Dec. 14, 1953 2 Sheets-Sheet 2
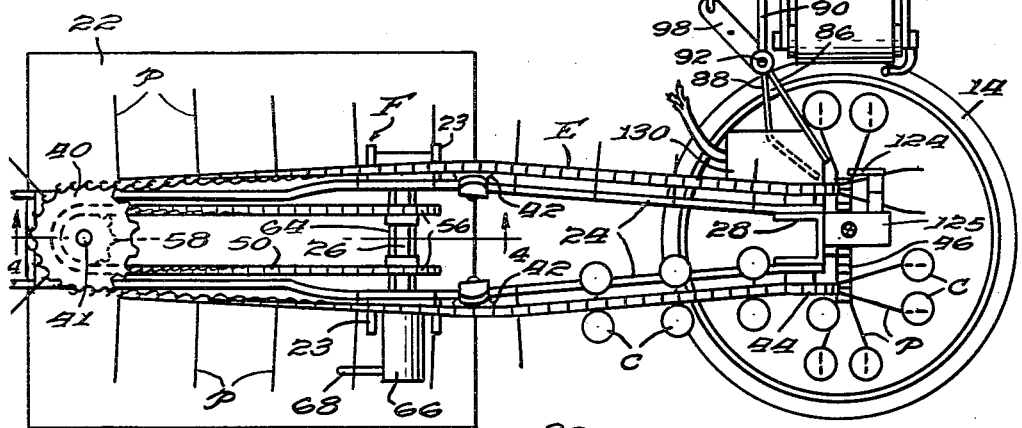
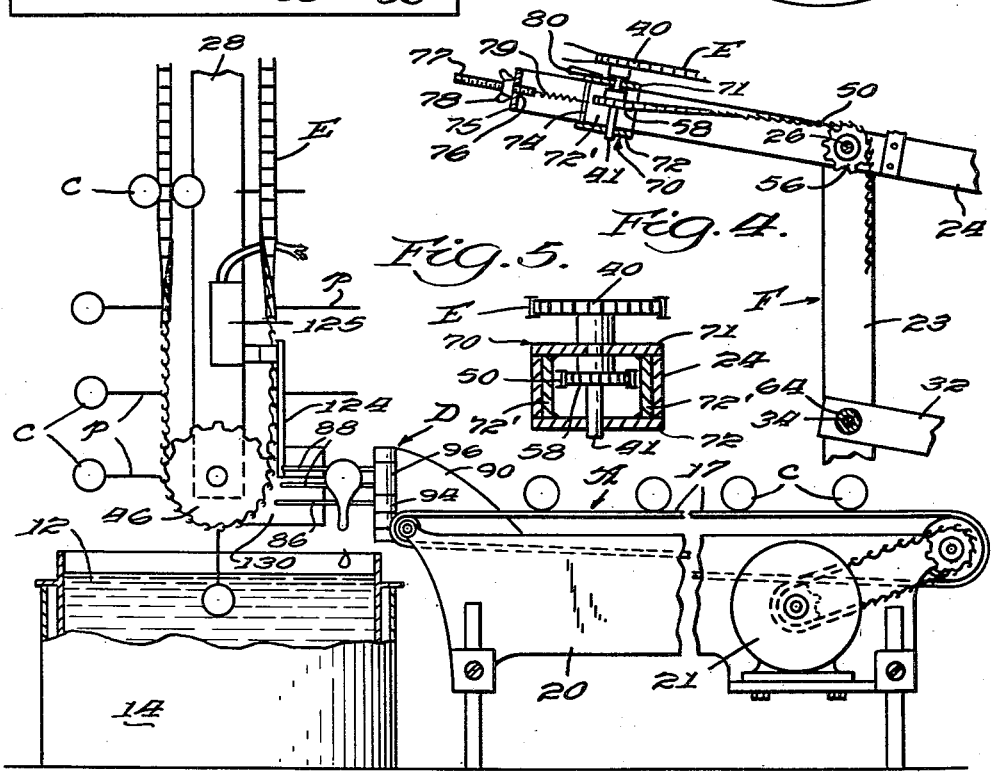
Inventor:
Carl B. Carlson.
By Fulwider, Mattingly & Babcock
Att'ys.

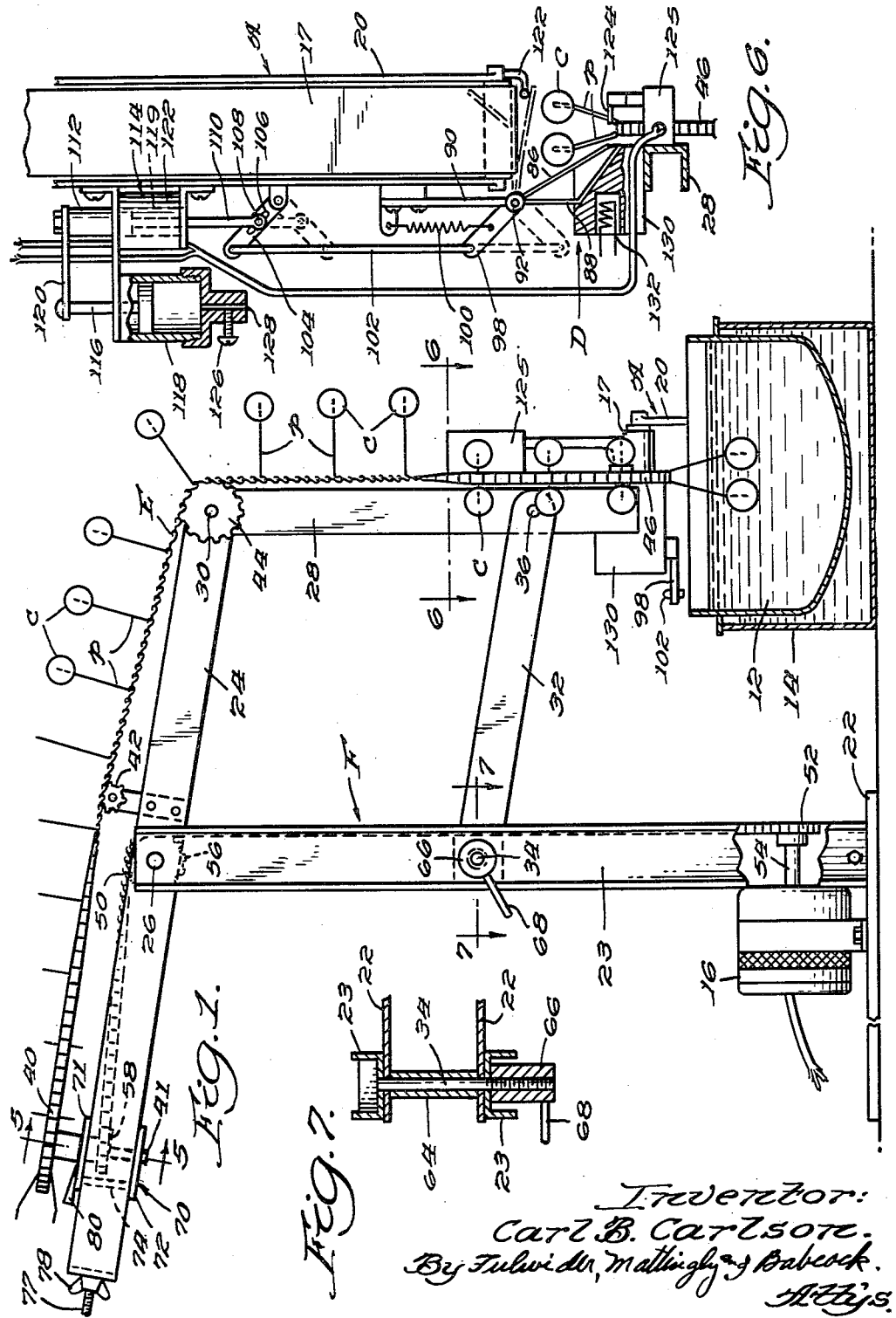

United States Patent Office 2,785,650
Patented Mar. 19, 1957

2,785,650

CONFECTIONARY COATING APPARATUS

Carl B. Carlson, San Gabriel, Calif., assignor to Thornton-Carlson, Pasadena, Calif., a corporation of California Application December 14, 1953, Serial No. 397,997

20 Claims. (Cl. 118—13)

The present invention relates generally to the field of confectionary manufacture, and more particularly to a novel apparatus for dipping an edible solid into a fluid confectionary material.

In the manufacture of certain articles of confectionary, it is necessary to dip an edible solid into a fluid confectionary material. One example is the manufacture of cherry cream center chocolate candies wherein a preserved cherry is dipped into a sugar fondant whereby the cherry is coated with the latter.

Such dipping has heretofore generally been carried out by hand. Hand dipping, however, is both expensive and time-consuming. Additionally, it may not always be particularly sanitary.

It is a major object of the present invention to provide mechanized apparatus for dipping an edible solid into a fluid confectionary material.

Another object is to provide confectionary apparatus of this nature which is entirely automatic in operation.

Yet another object is to provide a confectionary apparatus of this nature which is simple in design and rugged of construction whereby it may afford a long and useful service life.

Still another object is to provide a confectionary apparatus of this nature that is foolproof in operation, which affords a high production rate, and which is light in weight whereby it may be readily transported.

An additional object is to provide confectionary apparatus of this nature which may be readily disassembled for cleaning after each period of operation.

A more particular object of the invention is to provide confectionary apparatus of this nature which incorporates unique means for removing the edible solids from the apparatus after they have been dipped, and for trimming excess confectionary material from each of the edible solids after such dipping has taken place.

These and other objects and advantages of the present invention will become apparent from the following detailed description of a preferred embodiment thereof, when taken in conjunction with the appended drawings wherein:

Figure 1 is a side elevational view of a preferred form of confectionary apparatus embodying the present invention;

Figure 2 is a top plan view of said apparatus;

Figure 3 is a front view of the lower portion of said apparatus;

Figure 4 is a vertical sectional view taken on lines 4—4 of Figure 2;

Figure 5 is a generally vertical sectional view taken on lines 5—5 of Figure 1;

Figure 6 is a horizontal sectional view taken on lines 6—6 of Figure 1; and

Figure 7 is an enlarged horizontal sectional view taken on lines 7—7 of Figure 1.

Referring to the drawings, the preferred form of apparatus embodying the present invention, broadly comprises a frame F that supports an endless flexible element E for movement along a fixed path. The flexible element E mounts a plurality of spaced-apart prongs P, each of which may be engaged by an edible solid, such as a cherry C, whereby the latter may be dipped into a fluid confectionary material 12, disposed in a double boiler type of container 14. The flexible element E is power-driven by an electric motor 16. After the cherries C have been dipped in the fluid confectionary material 12, they are trimmed of excess fluid confectionary material and removed from the prongs P so as to be deposited upon the belt 19 of a conveyer belt apparatus A by a combined detailer and plucker mechanism D, the operation of which mechanism is automatically synchronized with the movement of the flexible element E in a manner to be fully disclosed hereinafter. The conveyer belt apparatus includes a frame 20 and an electric motor 21 for driving the belt 19.

With regard to a more particular description of the apparatus of the present invention, the frame F includes a horizontal base 22 rigidly mounting a pair of parallel upright columns 23. A pair of generally horizontal, rigidly connected cross-bars 24 are pivotally secured at their intermediate portions to the upper ends of the columns 23 by a horizontal pivot pin 26. A vertically extending front leg 28 is pivotally connected at its upper end to the front end of the cross arm 24 by a pivot pin 30. The frame also includes a pair of generally horizontal spacer arms 32 that are pivotally connected at their rear ends to the intermediate portion of the columns 23 by a pivot bolt 34 and at their front ends to the lower portion of the front leg 28 by a pivot pin 36. With this arrangement, the front leg 28 may be moved vertically while constantly remaining parallel to the upright columns 23.

The flexible element E will preferably consist of a metal chain made up of a plurality of a generally square-sided links. This chain is carried by several toothed pulleys which are in turn rotatably mounted by the frame F. Thus, a drive pulley 40 is mounted on a vertical shaft 41 which is journaled at the rear of the cross-bar member 24, a pair of pulleys 42 are mounted at the intertermediate portion of the cross-bar member 24, a pair of front pulleys 44 are mounted by the pivot pin 30, and a lower pulley 46 is mounted at the lower end of the front leg 28. The chain E rigidly mounts a plurality of aligned pairs of the wire prongs P at generally equidistantly-spaced centers. These prongs extend away from the upper surface of the chain at substantially right angles thereto.

The electric motor 16 is of conventional construction and is mounted upon the base 22. The rotation of this motor is transferred to the drive pulley 40 by means of a second chain 50. The latter chain 50 is carried upon a toothed pulley 52 that is keyed to the shaft 54 of the electric motor, a pair of toothed pulleys 56 are rotatably supported by the pivot 26, and a toothed pulley 28 is keyed to the shaft 41 upon which is mounted the drive pulley 40.

During operation of the motor 16, the chain E, and hence its prongs P, will be caused to move along a fixed path relative to the frame F and the container 14. It is contemplated that the cherries C be either manually or automatically inserted upon the prongs P at some point along this fixed path whereby such movement of the chain will move the cherries downwardly along the side of the front leg 28 and into the fluid confectionary material 12. Conveniently, the cherries will be inserted adjacent one of the intermediate pulleys 42 whereby these pulleys may offer a support against the force required to force the cherries on the prongs.

Preferably, the elevation of the lower portion of the front leg 28 relative to the container 14, may be adjusted at will. This feature makes it possible to continue the cherry dipping operation despite fluctuations in the level of the fluid confectionary material 12. Referring to Figure 7, it will be seen that the pivot bolt 34 is disposed within a tube 64 which bridges the columns 22. The threaded end of the pivot bolt is engaged by an internally threaded lock sleeve 66 whereon is formed a manipulating handle 68. When the lock sleeve 66 is loosened relative to the pivot bolt, the spacer arms 32 are free to rotate relative to the columns 23. Tightening of the lock sleeve 66 upon the pivot bolt, however, will restrain movement of these arms relative to the columns and thereby lock the assembly of spacer arms 32, cross-bar member 24, and front leg 28.

Referring to Figures 4 and 5, the drive pulley 40 is keyed to the shaft 41. This shaft is in turn journaled within a slider block 70. The slider block includes a pair of upper and lower plates 71 and 72 that are rigidly connected by a pair of side plates 73. These plates have a sliding relationship relative to the cross-bar member 24 whereby the slider block 70 is longitudinally movable with respect thereto. The shaft 41 is journaled within vertically aligned bores formed in plates 71 and 72. A vertical anchor pin 74 interconnects the rear portions of the upper and lower plates 71 and 72, as shown in Figure 4. As is also shown in this figure, the rear end of the cross-bar member 24 is bridged by a spacer 75 that is formed with a bore 76. This bore 76 slidably mounts an externally threaded post 77, the threads of which post are engaged by a wing nut 78. A tension spring 79 is interposed between the front of the post 77 and the anchor pin 74 so as to constantly bias the slider block rearwardly relative to the cross-arm member 24. In this manner, the chains E and 50 will be maintained under tension. A curved guide bar 80 may be formed on the rear of the slider block 70 so as to insure that the weight of the cherries C will not cause them to engage the cross-arms 24.

Referring now to Figures 2, 3 and 6, the detailer and plucker mechanism D includes a straight horizontal detailing wire 86, and a pair of horizontal plucker wires 88, disposed thereabove, the latter being generally V-shaped in plan view. These wires 86 and 88 are shown mounted adjacent the container 14 to one side of the path followed by the cherries C. Conveniently, they will be supported at the end of the frame 20 of the conveyer apparatus A, proximate to the frame F upon a support 90. This latter support 90 includes a vertical shaft 92, and the detailing wire 86 is secured to a lower block element 94 carried by the shaft 92. The pair of plucker wires 88 are secured to a second block element 96 that is likewise carried by the shaft 92. A lever 98 extends radially outwardly from the shaft 92, which lever is constantly biased towards its solid line position of Figure 6 by a tension spring 100. The outer end of this lever 98 is pivotally connected to one end of a rod 102. The opposite end of this rod 102 is in turn pivotally connected to a second lever 104, which lever is pivotally connected to one side of the frame 20. The mid-portion of the second lever 104 is formed with a slot 106. This slot 106 slidably receives a pin 108 that is mounted by the free end of a plunger 110. The upper end of this plunger 110 is rigidly connected to the core 112 of an electric solenoid 114. The core 112 is also rigidly affixed to the piston rod 116 of a conventional dash-pot 118 by a short bar 120. With this arrangement, the excitation of the winding 122 of the solenoid 114 will cause the core 112 to be drawn into the cavity 119 encompassed by these windings. This movement will, in turn, move the plunger 110, levers 104, and rods 102 and 98 to their dotted line positions of Figure 6, whereby the shaft 92 will be rotated in a counter-clockwise direction through a predetermined number of degrees. This movement of the shaft will effect concurrent counter-clockwise movements of the wires 86 and 88. Preferably, the lowermost block element 94 will incorporate a "lost motion" type of connection to the shaft 92 whereby the detailing wire 86 will be stopped short of the belt 120 of the conveyor belt apparatus by a stop element 122, as indicated in Figure 6. With this arrangement, any confectionary material which clings to the detailing wire will be prevented from being deposited upon the conveyor belt 19.

Periodic energization of the electric solenoid 114 may be controlled by the successive engagement of the prongs P with contact 124 of a conventional electric switch 125 mounted by the lower portion of the front leg 28, as shown in Figures 2, 3 and 6. The speed of movement of the detailing and plucker wires is controlled by a set screw 126 disposed in the orifice 128 of the dash-pot 118, the latter construction being clearly shown in Figure 6. Preferably, the detailing and plucker wires 86 and 88 will be heated in order to avoid a building up of the fluid confectionary material 12 thereupon. To this end, these wires may be caused to abut a heating block 130 while they are in their retracted position. As shown in Figure 6, this heating block 130 is constantly heated by electric resistance wires 132.

It should be particularly observed that the chain E and its prongs P may be readily removed from the frame F to facilitate their cleaning after each working period. In order to remove this chain, it is only necessary to unscrew the wing nut 78 whereby the post 77, spring 79, and slider block 70 will also be free for movement forwardly relative to the cross-bars 24. The chain E will be thereby loosened whereby it may be readily disengaged from the drive pulley 41 and lifted upwardly off the remaining toothed pulleys.

While there has been shown and described what is presently considered to be the preferred form of the invention, it will be apparent that various changes and modifications may be made thereto without departing from the spirit of the invention or the scope of the following claims.

I claim:

1. Apparatus for dipping an edible solid into a container of fluid confectionary material, comprising: a frame; an endless flexible element; pulley means on said frame supporting said flexible element for movement along a fixed path relative to said frame and said container; a plurality of spaced-apart prongs extending from said flexible element for insertion into said edible solids; power-driven means for effecting movement of said flexible element along said fixed path whereby said edible solids will be moved into and out of the confines of said container; a plucking member that is successively movable into and out of said path for urging said edible solids off the free ends of said prongs; a detailing finger that is successively movable into and out of said path for removing excess confectionary material from said solids; and, means for heating said detailing finger and said plucking member.

2. Apparatus for dipping an edible solid into a container of fluid confectionary material, comprising: a frame; a plurality of pulleys mounted by said frame, including a drive pulley; an endless flexible element supported by said pulleys for movement along a fixed path relative to said frame and said container; a plurality of spaced-apart prongs extending from said flexible element for insertion into said edible solids; a slider block slidably carried by said frame and having a shaft to which said drive pulley is keyed; motor means having a rotatable shaft; a second set of pulleys mounted by said frame including pulleys that are keyed to each of said shafts; a second flexible element supported by said second set of pulleys; means for biasing said slider block in a direction to apply tension to said flexible elements; a detailing finger that is successively movable into and out of said path for trimming excess confectionary material from said edible solids; a plucking member that is successively movable into and out of said path for urging said edible solids off the free ends of said prongs; and means for applying heat to said detailing finger and to said plucking member.

3. Apparatus for dipping an edible solid into a container of fluid confectionary material, comprising: a frame; a plurality of toothed pulleys mounted by said frame, including a drive pulley; an endless chain supported by said pulleys for movement along a fixed path relative to said frame and said container; a plurality of aligned pairs of prongs extending from one side of said chain for receiving said edible solids; a slider block slidably carried by said frame and having a shaft to which said drive pulley is keyed; motor means having a rotatable shaft; a second set of pulleys mounted by said frame, including pulleys that are keyed to each of said shafts; a second chain supported by said second set of pulleys; and, spring means interposed between said slider block and said frame for constantly biasing said block in a direction to apply tension to said chains.

4. Apparatus for dipping an edible solid into a container of fluid confectionary material, comprising: a frame including an upright column member which pivotally mounts a pair of cross-arms; a plurality of pulleys mounted by said frame, including a drive pulley; an endless flexible element supported by said pulleys for movement along a fixed path relative to said frame and said container; a plurality of spaced-apart prongs extending from said flexible element for insertion into said edible solids; a slider block slidably mounted between said cross-arms for longitudinal movement relative thereto; a shaft journaled by said slider block and mounting said drive pulley; motor means on said frame and having a rotatable shaft; a second set of pulleys mounted by said frame including pulleys that are keyed to each of said shafts; a second endless flexible element supported by said second set of pulleys; spring means interposed between said slider block and said cross-arms for applying tension to said flexible elements; and, means for adjusting the force being applied by said spring means.

5. Apparatus for dipping an edible solid into a container of fluid confectionary material, comprising: a frame, including a base, a pair of upright columns, a pair of cross-arms pivotally connected to the upper end of said columns, a vertical front arm pivotally connected at its upper end to the front of said cross-arms, and a pair of spacer arms pivotally connected at their rear ends to the intermediate portion of said columns and at its front end to the lower end of said front arm; a first set of toothed pulleys mounted by said cross-arms and said front arm, including a drive pulley; an endless chain supported by said pulleys for movement along a fixed path relative to said frame and said container; a plurality of aligned pairs of prongs extending from one side of said chain for receiving said edible solids; a slider block slidably mounted between the rear portion of said cross-arms for longitudinal movement relative thereto; a shaft journaled by said slider block and mounting said drive pulley; an electric motor secured to said base and having a rotatable shaft; a second set of toothed pulleys including pulleys that are keyed to each of said shafts; a second endless chain supported by said second set of pulleys; a spacer arm connecting the rear ends of said cross-arms and formed with a bore; an externally threaded post disposed in said bore; an adjusting nut engaged with the threads of said post; and, a tension spring interposed between the front of said post and said slider block.

6. Apparatus for dipping an edible solid into a container of fluid confectionary material, comprising: a frame, including a base, a pair of upright columns, a pair of cross-arms pivotally connected to the upper end of said columns, a vertical front arm pivotally connected at its upper end to the front of said cross-arms, and a pair of spacer arms; means pivotally connecting the front end of said spacer arms to the lower end of said front arm; a pivot bolt extending through the intermediate portion of said columns for pivotally connecting the rear ends of said spacer arms thereto; a tube bridging said columns and encompassing said pivot bolt; a threaded lock sleeve engaging the threads of said pivot bolt; a first set of toothed pulleys mounted by said cross-arms and said front arm, including a drive pulley; an endless chain supported by said pulleys for movement along a fixed path relative to said frame and said container; a plurality of aligned pairs of prongs extending from one side of said chain for receiving said edible solids; a slider block slidably mounted between the rear portion of said cross-arms for longitudinal movement relative thereto; a shaft journaled by said slider block and mounting said drive pulley; an electric motor secured to said base and having a rotatable shaft; a second set of toothed pulleys including pulleys that are keyed to each of said shafts; a second endless chain supported by said second set of pulleys; a spacer arm connecting the rear ends of said cross-arms and formed with a bore; an externally threaded post disposed in said bore; an adjusting nut engaged with the threads of said post; and a tension spring interposed between the front of said post and said slider block.

7. Apparatus for dipping an edible solid into a container of fluid confectionary material, comprising: a frame; an endless flexible element; pulley means on said frame supporting said flexible element for movement along a fixed path relative to said frame and said container; a plurality of spaced-apart prongs extending from said flexible element for insertion into said edible solids; power-driven means for effecting movement of said flexible element along said fixed path whereby said edible solids will be moved into and out of the confines of said container; a detailing finger wire that is successively movable into and out of said path for trimming excess confectionary material from said edible solids; a plucker wire that is successively movable into and out of said path for urging said edible solids off the free ends of said prongs; electric solenoid means for actuating said wires; and, an electric switch for periodically energizing said solenoid means, said switch including a contact disposed in the path followed by said prongs whereby it will be successively engaged by each of said prongs.

8. Apparatus for dipping an edible solid into a container of fluid confectionary material and thereafter depositing said edible solid upon a conveyer belt apparatus, comprising: a frame; an endless flexible element; pulley means on said frame supporting said flexible element for movement along a fixed path relative to said frame and said container; a plurality of spaced-apart prongs extending from said flexible element for insertion into said edible solids; power-driven means for effecting movement of said flexible element along said fixed path whereby said edible solids will be moved into and out of the confines of said container; a support mounted by said conveyer belt apparatus proximate said fixed path; a vertical shaft carried by said support; a first block carried by said vertical shaft and rigidly mounting a plucker wire; a second block carried by said vertical shaft; a detailing wire secured to said second block; a lost-motion connection between said second block and said vertical shaft; a stop formed on said conveyer belt apparatus for engaging said detailing wire; an electric solenoid mounted by said conveyer belt apparatus; means connecting said vertical shaft and said solenoid whereby upon energization of said solenoid said vertical shaft will be rotated through a predetermined number of degrees across said fixed path; and, an electric switch for periodically energizing said solenoid, said switch including a contact disposed in the path followed by said prongs whereby it will be successively engaged by each of said prongs.

9. Apparatus for dipping an edible solid into a container of fluid confectionary material and thereafter depositing said edible solid upon a conveyor belt apparatus, comprising: a frame; an endless flexible element; pulley means on said frame supporting said flexible element for movement along a fixed path relative to said frame and said container; a plurality of spaced-apart prongs extending from said flexible element for insertion into said edible solids; power-driven means for effecting movement of said flexible element along said fixed path whereby said edible solids will be moved into and out of the confines of said container; a support mounted by said conveyer belt apparatus proximate said fixed path; a vertical shaft carried by said support; a first block carried by said vertical shaft and rigidly mounting a plucker wire; a second block carried by said vertical shaft; a detailing wire secured to said second block; a lost-motion connection between said second block and said vertical shaft; a stop formed on said conveyer belt apparatus for engaging said detailing wire; an electric solenoid mounted by said conveyer belt apparatus; spring means normally biasing said wires out of said fixed path; means connecting said vertical shaft and said solenoid whereby upon energization of said solenoid said vertical shaft will be rotated through a predetermined number of degrees across said fixed path; a dash-pot for controlling the speed of rotation of said vertical shaft; and, an electric switch for periodically energizing said solenoid, said switch including a contact disposed in the path followed by said prongs whereby it will be successively engaged by each of said prongs.

10. Apparatus for dipping an edible solid into a container of fluid confectionary material and thereafter depositing said edible solid upon a conveyer belt apparatus, comprising: a frame; an endless flexible element; pulley means on said frame supporting said flexible element for movement along a fixed path relative to said frame and said containers; a plurality of spaced-apart prongs extending from said flexible element for insertion into said edible solids; power-driven means for effecting movement of said flexible element along said fixed path whereby said edible solids will be moved into and out of the confines of said container; a support mounted by said conveyer belt apparatus proximate said fixed path; a vertical shaft carried by said support; a first block carried by said vertical shaft and rigidly mounting a plucker wire; a second block carried by said vertical shaft; a detailing wire secured to said second block; a lost-motion connection between said second block and said vertical shaft; a stop formed on said conveyer belt apparatus for engaging said detailing wire; an electric solenoid mounted by said conveyer belt apparatus; a heating block; spring means normally biasing said wires out of said fixed path and abutting said heating block; means connecting said vertical shaft and said solenoid whereby upon energization of said solenoid said vertical shaft will be rotated through a predetermined number of degrees across said fixed path; a dash-pot for controlling the speed of rotation of said vertical shaft; and an electric switch for periodically energizing said solenoid, said switch including a contact disposed in the path followed by said prongs whereby it will be successively engaged by each of said prongs.

11. Apparatus for dipping an edible solid into a container of fluid confectionary material and thereafter depositing said edible solid upon a conveyer belt apparatus, comprising: a frame; an endless flexible element; pulley means on said frame supporting said flexible element for movement along a fixed path relative to said frame and said container; a plurality of spaced-apart prongs extending from said flexible element for insertion into said edible solids; power-driven means for effecting movement of said flexible element along said fixed path whereby said edible solids will be moved into and out of the confines of said container; a support mounted by said conveyer belt apparatus proximate said fixed path; a vertical shaft carried by said support; a first block carried by said vertical shaft; a plucker wire rigidly secured to said first block; a second block carried by said vertical shaft; a detailing wire secured to said second block; a lost-motion connection between said second block and said vertical shaft; a stop formed on said conveyer belt apparatus for engaging said detailing wire; an electric solenoid mounted by said conveyer belt apparatus; a lever radially extending from said vertical shaft; a second lever radially extending from said conveyer belt apparatus and having one end pivotally affixed thereto, said lever being formed with an elongated slot; a rod pivotally connected at its opposite ends to the free ends of said levers; a plunger secured at one end to the core of said solenoid and at its other end slidably secured within said elongated slot; a dash-pot having a piston and a cylinder formed with an orifice; a set screw disposed in said orifice; a bar rigidly connecting said core and said piston; a heating block; a tension spring interposed between one of said levers and said conveyer belt apparatus for normally biasing said wires out of said fixed path and abutting said heating block; and, an electric switch for periodically energizing said solenoid, said switch including a contact disposed in the path followed by said prongs whereby it will be successively engaged by each of said prongs.

12. Apparatus for dipping an edible solid into a container of fluid confectionary material and thereafter depositing said edible solid upon a conveyer belt apparatus, comprising: a frame including an upright column member which pivotally mounts a pair of cross-arms; a plurality of pulleys mounted by said frame, including a drive pulley; an endless flexible element supporting said pulleys for movement along a fixed path relative to said frame and said container; a plurality of spaced-apart prongs extending from said flexible element for insertion into said edible solids; a slider block slidably mounted between said cross-arms for longitudinal movement relative thereto; a shaft journaled by said slider block and mounting said drive pulley; motor means on said frame and having a rotatable shaft; a second set of pulleys mounted by said frame including pulleys that are keyed to each of said shafts; a second endless flexible element supported by said second set of pulleys; spring means interposed between said slider block and said cross-arms for applying tension to said flexible elements; means for adjusting the force being applied by said spring means; a support mounted by said conveyer belt apparatus proximate said fixed path; a vertical shaft carried by said support; a first block carried by said vertical shaft and rigidly mounting a plucker wire; a second block carried by said vertical shaft; a detailing wire secured to said second block; a lost-motion connection between said second block and said vertical shaft; a stop formed on said conveyer belt apparatus for engaging said detailing wire; an electric solenoid mounted by said conveyer belt apparatus; means connecting said vertical shaft and said solenoid whereby upon energization of said solenoid, said vertical shaft will be rotated through a predetermined number of degrees across said fixed path; and, an electric switch for periodically energizing said solenoid, said switch including a contact disposed in the path followed by said prongs whereby it will be successively engaged by each of said prongs.

13. Apparatus for dipping an edible solid into a container of fluid confectionary material and thereafter depositing said edible solid upon a conveyor belt apparatus, comprising: a frame including an upright column member which pivotally mounts a pair of cross-arms; a plurality of pulleys mounted by said frame, including a drive pulley; an endless flexible element supporting said pulleys for movement along a fixed path relative to said frame and said container; a plurality of spaced-apart prongs extending from said flexible element for insertion into said edible solids; a slider block slidably mounted between said cross-arms for longitudinal movement relative thereto; a shaft journaled by said slider block and mounting said drive pulley; motor means on said frame and having a rotatable shaft; a second set of pulleys mounted by said frame including pulleys that are keyed to each of said shafts; a second endless flexible element supported by said second set of pulleys; spring means interposed between said slider block and said cross-arms for applying tension to said flexible elements; means for adjusting the force being applied by said spring means; a support mounted by said conveyer belt apparatus proximate said fixed path; a vertical shaft carried by said support; a first block carried by said vertical shaft and rigidly mounting a plucker wire; a second block carried by said vertical shaft; a detailing wire secured to said second block; a lost-motion connection between said second block and said vertical shaft; a stop formed on said conveyor belt apparatus for engaging said detailing wire; an electric solenoid mounted by said conveyer belt apparatus; second spring means normally biasing said wires out of said fixed path; means connecting said vertical shaft and said solenoid whereby upon energization of said solenoid, said vertical shaft will be rotated through a predetermined number of degrees across said fixed path; a dash-pot for controlling the speed of rotation of said vertical shaft; and, an electric switch for periodically energizing said solenoid, said switch including a contact disposed in the path followed by said prongs whereby it will be successively engaged by each of said prongs.

14. Apparatus for dipping an edible solid into a container of fluid confectionary material and thereafter depositing said edible solid upon a conveyer belt apparatus, comprising: a frame; a plurality of toothed pulleys mounted by said frame, including a drive pulley; an endless chain supporting said pulleys for movement along a fixed path relative to said frame and said container; a plurality of aligned pairs of prongs extending from one side of said chain for receiving said edible solids; a slider block slidably carried by said frame and having a shaft to which said drive pulley is keyed; motor means having a rotatable shaft; a second set of pulleys mounted by said frame, including pulleys that are keyed to each of said shafts; a second chain supported by said second set of pulleys; spring means interposed between said slider and said frame for constantly biasing said block in a direction to apply tension to said chains; a support mounted by said conveyor belt apparatus proximate said fixed path; a vertical shaft carried by said support; a first block carried by said vertical shaft and rigidly mounting a plucker wire; a second block carried by said vertical shaft; a detailing wire secured to said second block; a lost-motion connection between said second block and said vertical shaft; a stop formed on said conveyer belt apparatus for engaging said detailing wire; an electric solenoid mounted by said conveyer belt apparatus; second spring means normally biasing said wires out of said fixed path; means connecting said vertical shaft and said solenoid whereby upon energization of said solenoid, said vertical shaft will be rotated through a predetermined number of degrees across said fixed path; a dash-pot for controlling the speed of rotation of said vertical shaft; and an electric switch for periodically energizing said solenoid, said switch including a contact disposed in the path followed by said prongs whereby it will be successively engaged by each of said prongs.

15. Apparatus for dipping an edible solid into a container of fluid confectionary material and thereafter depositing said edible solid upon a conveyer belt apparatus, comprising: a frame, including a base, a pair of upright columns, a pair of cross-arms pivotally connected to the upper end of said columns, a vertical front arm pivotally connected at its upper end to the front of said cross-arms, and a pair of spacer arms pivotally connected at its rear end to the intermediate portion of said columns and at its front end to the lower end of said front arm; a first set of toothed pulleys mounted by said cross-arms and said front arm, including a drive pulley; an endless chain supported by said pulleys for movement along a fixed path relative to said frame and said container; a plurality of aligned pairs of prongs extending from one side of said chain for receiving said edible solids; a slider block slidably mounted between the rear portion of said cross-arms for longitudinal movement relative thereto; a shaft journaled by said slider block and mounting said drive pulley; an electric motor secured to said base and having a rotatable shaft; a second set of toothed pulleys including pulleys that are keyed to each of said shafts; a second endless chain supported by said second set of pulleys; a spacer arm connecting the rear ends of said cross-arms and formed with a bore; an externally threaded post disposed in said bore; an adjusting nut engaged with the threads of said post; a tension spring interposed between the front of said post and said slider block; a support mounted by said conveyer belt apparatus proximate said fixed path; a vertical shaft carried by said support; a first block carried by said vertical shaft and rigidly mounting a plucker wire; a second block carried by said vertical shaft; a detailing wire secured to said second block; a lost-motion connection between said second block and said vertical shaft; a stop formed on said conveyer belt apparatus for engaging said detailing wire; an electric solenoid mounted by said conveyer belt apparatus; second spring means normally biasing said wires out of said fixed path; means connecting said vertical shaft and said solenoid whereby upon energization of said solenoid, said vertical shaft will be rotated through a predetermined number of degrees across said fixed path; a dash-pot for controlling the speed of rotation of said vertical shaft; and an electric switch for periodically energizing said solenoid, said switch including a contact disposed in the path followed by said prongs whereby it will be successively engaged by each of said prongs.

16. Apparatus for dipping an edible solid into a container of fluid confectionary material, comprising: a frame; an endless flexible element; a plurality of spaced-apart prongs on said flexible element insertable into said edible solids; means interposed between said frame and said flexible element for effecting movement of the latter along a fixed path relative to said frame and said container whereby said edible solids will be moved into and out of the confines of said container; a plucking member operatively connected to said frame so as to be successively movable into and out of said path for engaging said edible solids and forcing them to slide off the free ends of said prongs; a detailing finger operatively connected to said frame so as to be successively movable into and out of said path for removing excess confectionary material from said solids; and means engaged by said plucking member and said detailing finger while they are out of said path for heating them.

17. Apparatus for dipping an edible solid into a container of fluid confectionary material, comprising: a frame; an endless flexible element; a plurality of spaced-apart prongs on said flexible element insertable into said edible solids; means interposed between said frame and said flexible element for effecting movement of the latter along a fixed path relative to said frame and said container whereby said edible solids will be moved into and out of the confines of said container; a plucking member operatively connected to said frame so as to be successively movable into and out of said path for engaging said edible solids and forcing them to slide off the free ends of said prongs; a detailing finger operatively connected to said frame so as to be successively movable into and out of said path for removing excess confectionary material from said solids; electric solenoid means for moving said plucker member and said detailing finger into and out of said path; and, an electric switch for periodically energizing said solenoid means, said switch including a contact disposed in the path followed by said prongs whereby it will be successively engaged by each of said prongs.

18. Apparatus as set forth in claim 17 which includes means for heating said plucking member and said detailing finger.

19. Apparatus for dipping an edible solid into a container of fluid confectionary material, comprising: a frame; an endless flexible element; a plurality of spaced-apart prongs on said flexible element insertable into said edible solids; means interposed between said frame and said flexible element for effecting movement of the latter along a fixed path relative to said frame and said container whereby said edible solids will be moved into and out of the confines of said container; a vertical shaft secured to said frame; a plucker member carried by said shaft for movement into and out of said path; a detailing finger carried by said shaft for movement into and out of said path; a lost-motion connection between said detailing finger and said shaft; a stop engageable by said detailing finger; and, means for periodically effecting rotation of said shaft in accordance with the position of said prongs relative to said plucker member and detailing finger.

20. Apparatus as set forth in claim 19 which includes means for heating said plucking member and said detailing finger.

References Cited in the file of this patent
UNITED STATES PATENTS

| | | |
|---|---|---|
| 1,461,760 | Morinsky | July 17, 1923 |
| 1,686,174 | Rauschenberger | Oct. 2, 1928 |
| 2,319,476 | Ray | May 18, 1943 |
| 2,333,557 | Fischer | Nov. 2, 1943 |
| 2,663,281 | Wright et al. | Dec. 22, 1953 |